No. 672,622. Patented Apr. 23, 1901.
H. ISHERWOOD.
MICROMETER GAGE.
(Application filed Oct. 4, 1900.)
(No Model.)
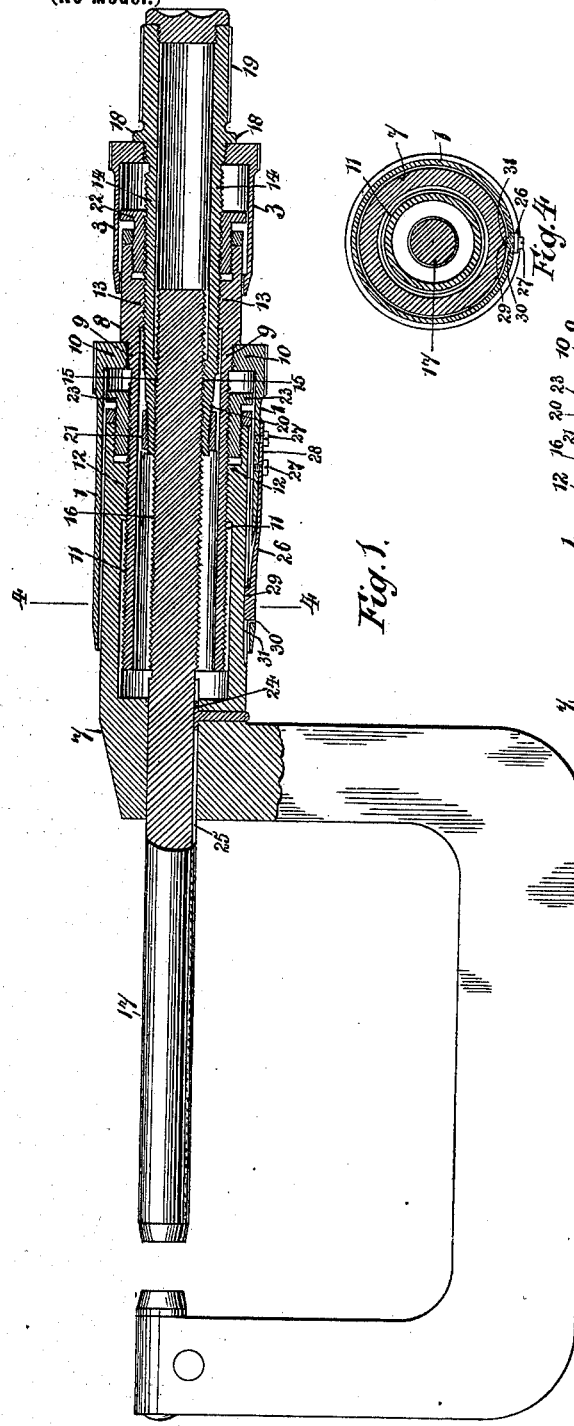
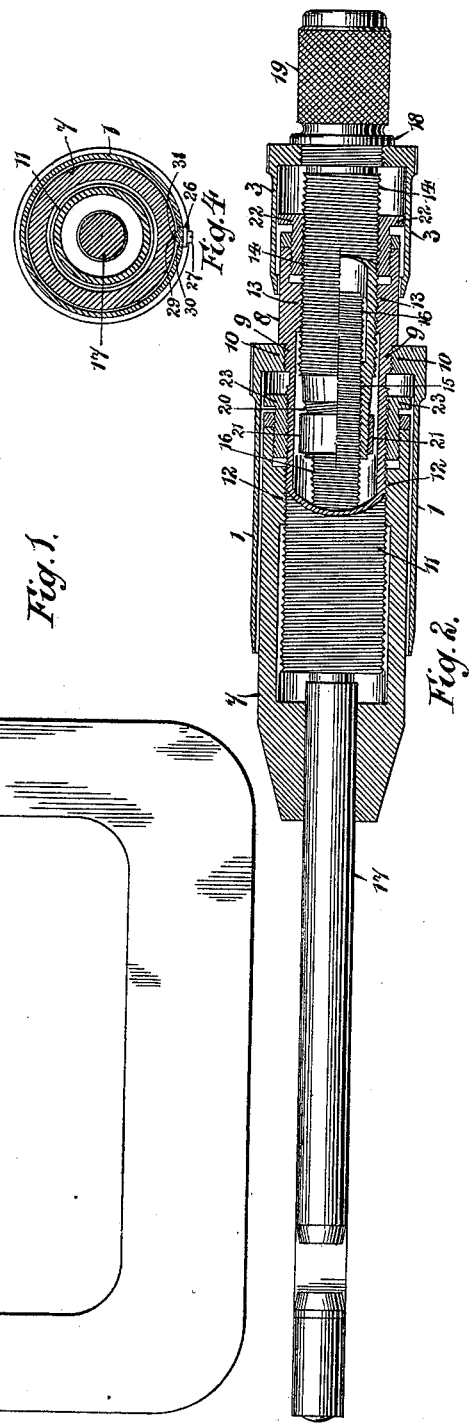
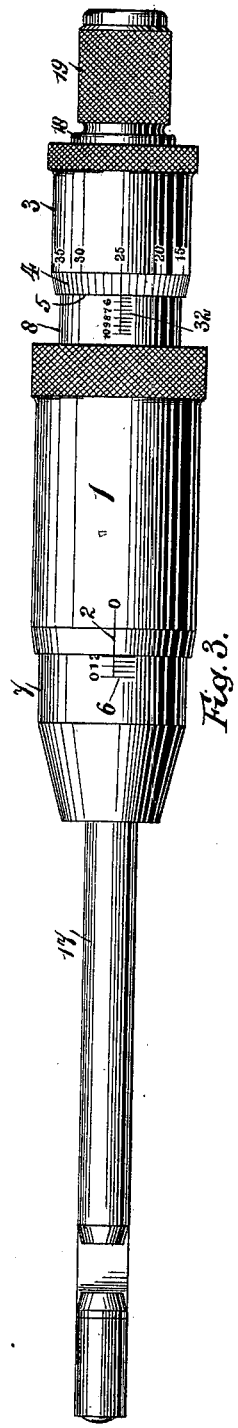
Witnesses.
Harry L. Cot
Robert E. McLaren.
Inventor.
Harold Isherwood
by Charles S. Woodroff
Attorney

UNITED STATES PATENT OFFICE.

HAROLD ISHERWOOD, OF BROADHEATH, ENGLAND, ASSIGNOR TO LINOTYPE COMPANY, LIMITED, OF LONDON, ENGLAND.

MICROMETER-GAGE.

SPECIFICATION forming part of Letters Patent No. 672,622, dated April 23, 1901.

Application filed October 4, 1900. Serial No. 32,035. (No model.)

*To all whom it may concern:*

Be it known that I, HAROLD ISHERWOOD, of the Linotype Works, Broadheath, in the county of Chester, England, have invented certain new and useful Improvements in Micrometer-Gages; and I do hereby declare the following to be a full, clear, and exact description of the invention, such as will enable others skilled in the art to which it appertains to make and use the same.

The present invention relates to improvements in micrometer-gages whereby the speed of the ram and the accuracy of the micrometer are both increased, while the readings are more legible than in the micrometers hitherto known.

Referring to the accompanying drawings, which are to be taken as part of this specification and read therewith, Figure 1 is a side elevation, partly in section, of a micrometer-gage made according to the present invention; Fig. 2, a plan of the same, likewise partly in section; Fig. 3, a plan corresponding to the previous figures, and Fig. 4 a sectional end elevation taken on the line 4 4 of Fig. 1.

1 is the thimble for the coarse readings, having a single index-mark 2 upon it.

3 is the thimble for the fine readings, having a circular scale 4 on its edge 5. The scale 6 for the large thimble 1 is alined on the hub 7 of the gage. The thimble 1 is fast to the large spindle 8, which has a screw-threaded collar 9 to engage with the screw-threaded end 10 thereof.

11 is a long screw-thread on the spindle 8, engaging with an internally-screw-threaded collar 12 inside the hub 7 and fast to it. 13 is a second internally-screw-threaded collar inside the tail of the spindle 8 and fast to it. This collar 13 engages with a second externally-screw-threaded spindle 14, while the front end of this spindle engages by an internal screw-thread 15 with the corresponding and external screw-thread 16 on the tail of the ram 17. The spindle 14 carries the thimble 3, which is made fast to it by being screwed up against a collar 18 on the said spindle. The latter is continued through the thimble 3 in the usual way terminating in a milled head 19. The front end or nose of the second spindle 14 is conical and has an external screw-thread 20, while 21 is a tightening-nut working thereon.

22 23 are glands or stuffing-boxes for the spindles 14 and 11, respectively.

The screw-threads 15 and 16 are of the same pitch as those at the spindle 11 and the hub 7, while those between the collar 13 and the spindle 14 are finer.

If the screw-threads between the spindle 11 and the collar 12 on the hub 7 are right-handed, those between the spindle 14 and the collar 13 on the spindle 11 are left-handed, and those 15 16 between the spindle 14 and the ram 17 are left-handed also. Thus the rotation of the thimble 1 takes the spindle 11 with it and the ram 17 is moved by the sum of the pitches of the screw-threads between the spindle 11 and the hub 7 and of the screw-threads 15 and 16. This motion is indicated on the hub-scale 6. When the second thimble 3 is rotated, the ram 17 is moved by the difference in pitch between the threads 15 and 16 on the one hand and those on the said thimble 3 and the spindle 14 on the other.

24 is an internal feather carried by the hub 7 and engaging in a longitudinal slot 25 in the ram 17 to prevent the latter from turning.

The combination of the scale 6 on the hub 7 and the index-mark on the thimble 1 is for integers only. There is provided a suitable detent to lock the said thimble to the hub 7 when the index-mark 2 registers with the scale 6. This detent is shown in Figs. 1 and 4 as consisting of a longitudinal spring-bar 26, held by screws 27 passed through its heel 28 into thimble 1, while its nose 29 passes through a slot 30 in the said thimble 1 to engage in a longitudinal slot 31 in the hub 7.

32 is a scale alined with the scale 6. It is for intermediate readings, the scale 4, already described, being for the finest readings. Thus the reading illustrated is: by the scale 6, .2; by the scale 32, .05; by the scale 4, .0025; total, .2525.

I claim—

The combination of spindle and hub, the former engaging with the latter by screw-threads of a given pitch and hand; a thimble carried by the said spindle; a second thimble carried by a second spindle engaging with the first spindle by screw-threads of a finer pitch and opposite hand; a ram engaged by the second spindle by screw-threads of the same pitch and opposite hand as those between the hub and first spindle; and three scales of varying fineness as set forth.

In testimony that I claim the foregoing as my invention I have signed my name in presence of two subscribing witnesses.

HAROLD ISHERWOOD.

Witnesses:
MARK BARR,
THOMAS TAYLOR.

Correction in Letters Patent No. 672,622.

It is hereby certified that the assignee, in Letters Patent No. 672,622, granted April 23, 1901, upon the application of Harold Isherwood, of Broadheath, England, for an improvement in "Micrometer-Gages," should have been described and specified as *The Linotype Company, Limited*, instead of "Linotype Company, Limited;" and that the said Letters Patent should be read with this correction therein that the same may conform to the record of the case in the Patent Office.

Signed, countersigned, and sealed this 25th day of June, A. D., 1901.

[SEAL.]
                   F. L. CAMPBELL,
                    *Assistant Secretary of the Interior.*

Countersigned:
 F. I. ALLEN,
  *Commissioner of Patents.*